United States Patent [19]

Knecht et al.

[11] 3,757,109

[45] Sept. 4, 1973

[54] RESILIENT LAMP MOUNTING DEVICE

[76] Inventors: Hillery G. Knecht, 525 Kingsley Trl., Bloomfield Hills, Mich. 48013; Adolph W. Grashoff, 13085 Lake Pointe Pass, Belleville, Mich. 48111

[22] Filed: Feb. 24, 1972

[21] Appl. No.: 229,125

[52] U.S. Cl. .................................. 240/90, 240/41.6

[51] Int. Cl. .......................................... F21v 15/04

[58] Field of Search .................. 240/41.35, 90, 41.6, 240/44, 41

[56] References Cited

UNITED STATES PATENTS

| | | | |
|---|---|---|---|
| 2,910,577 | 10/1959 | Bolmeyer | 240/90 X |
| 3,065,342 | 11/1962 | Worden | 250/90 |

*Primary Examiner*—Samuel S. Matthews
*Assistant Examiner*—Richard A. Wintercorn
*Attorney*—Lon H. Romanski

[57] ABSTRACT

A resilient mounting device for a lamp, such as a sealed beam unit, is formed of a non-metallic resilient material and has a generally bulbous body portion with a concave inner surface and a convex outer surface; a ring portion formed at the large open end of the body portion, integrally therewith, has an inner annular groove which is partly defined by a forwardly disposed flange or lip portion resiliently deformable to permit the passage therethrough of a sealed beam unit to be carried generally peripherally within the annular groove; a plurality of ears or flange portions are provided for direct mounting of the body and lamp to an associated vehicle.

19 Claims, 4 Drawing Figures

RESILIENT LAMP MOUNTING DEVICE

BACKGROUND OF THE INVENTION

Many vehicles, especially army vehicles, trucks, farm vehicles and the like which are designed to operate cross-country or over rough roads, experience lamp failure due to a mechanical failure of the bulb filaments resulting from the extreme vibrational stresses experienced by the vehicle and transmitted to the lamp or bulb.

Numerous attempts have, in the past, been made to solve this problem. The method most tried has been to place rubber spacers between the vehicle and the lamp casing. However, this method has not proven to be satisfactory for various reasons. For example, in mounting the lamp casing to the vehicle, as the screws are tightened the rubber spacers are compressed thereby for all practical purposes loosing the resiliency they were supposed to provide.

Accordingly, the invention as herein disclosed and claimed is primarily directed to the solution of the above as well as other related problems.

SUMMARY OF THE INVENTION

According to the invention, a resilient shock absorbing device for mounting a lamp to a related vehicle comprises a unitary non-metallic mount, said non-metallic mount comprising a rearwardly disposed body portion generally defining an interior chamber adapted for at least the partial reception therein of said lamp, said chamber defining a generally forwardly directed open end, an annular ring portion formed on said body portion in a manner generally circumscribing said open end, said annular ring portion comprising an annular groove formed therein so as to be radially inwardly open, said annular ring portion further comprising generally radially directed resiliently deflectable flange means, said deflectable flange means being effective upon deflection to permit the passage therethrough of said lamp and being further effective when not experiencing said deflection to retain said lamp in a seated position determined by said annular groove, and a plurality of flange-like mounting portions formed on said non-metallic mount adapted for operative connection to said related vehicle.

Various general and specific objects and advantages of the invention will become apparent when reference is made to the following detailed description considered in conjunction with the accompanying drawings.

DESCRIPTION OF THE DRAWINGS

In the drawings, wherein for purposes of clarity certain details and elements may be omitted from one or more views.

DESCRIPTION OF THE PREFERRED EMBODIMENT

Figure 1:
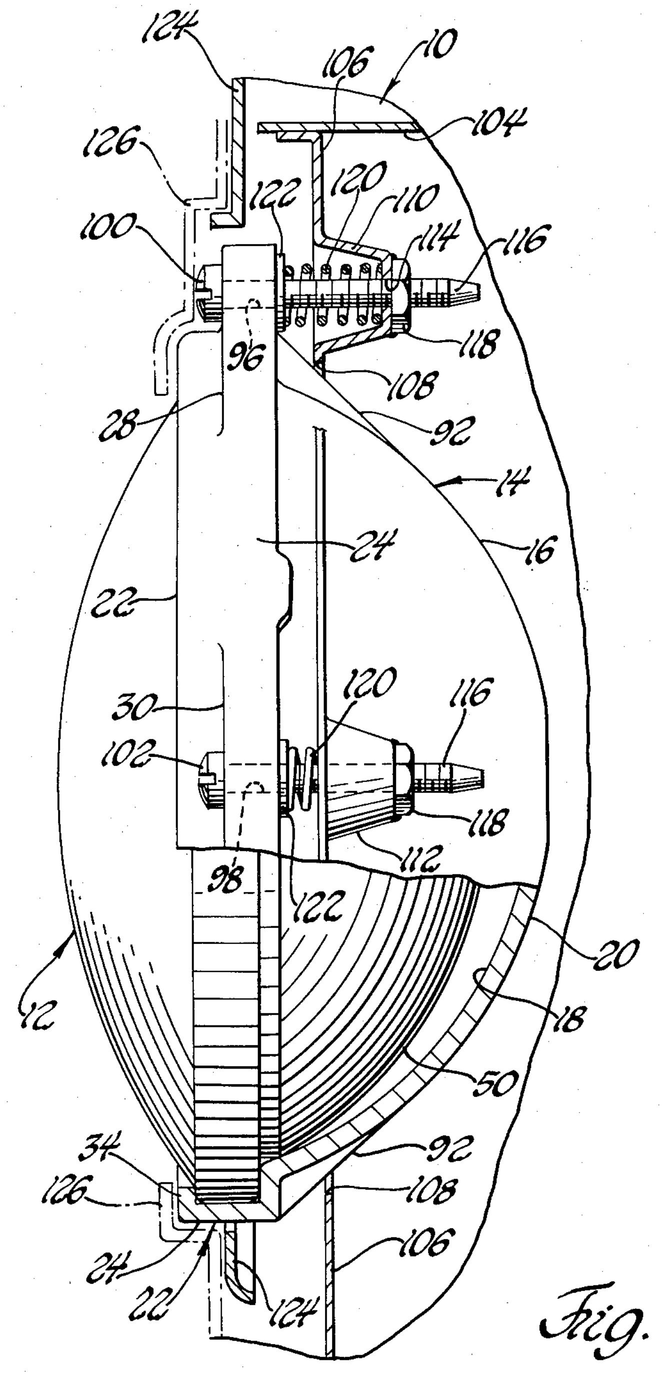
FIG. 1 is a side elevational view of a resilient mount operatively supporting a lamp, such as a sealed beam unit, to an associated vehicle with certain portions being shown broken away and cross-hatched.

Referring now in greater detail to the drawings, FIG. 1 illustrates a fragmentary portion 10 of an associated vehicle, such as an automobile or truck, with a headlamp or bulb 12 operatively secured thereto through a headlamp mount 14 constructed in accordance with the teachings of the invention.

Figures 2, 3, 4:
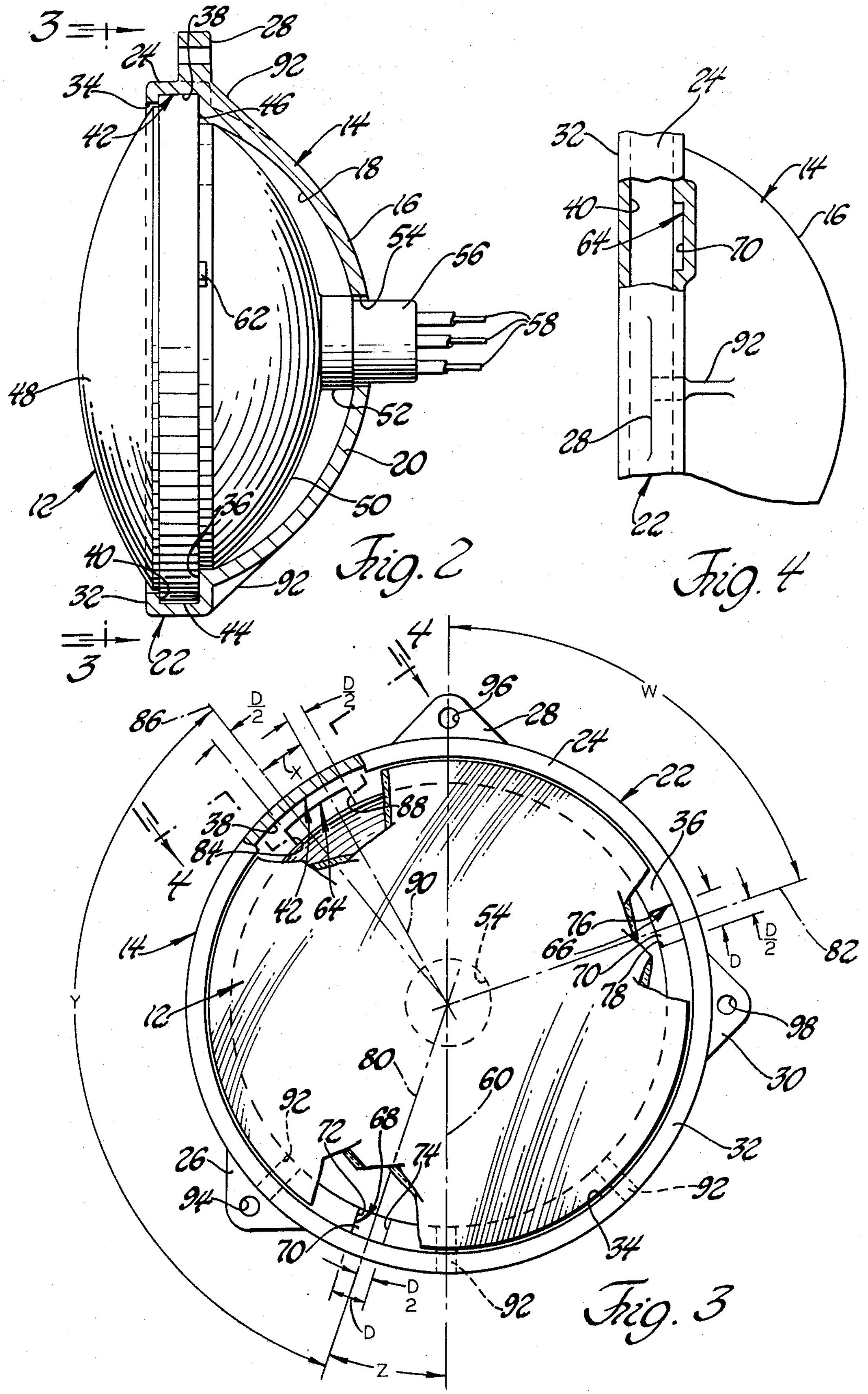
FIG. 2 illustrates, in vertical cross-section, the resilient mount of FIG. 1 with a sealed beam unit retained therein.
FIG. 3 is a view taken generally on the plane of line 3—3 of FIG. 2, with portions broken away and cross-hatched, and looking in the direction of the arrows.
FIG. 4 is a fragmentary portion of the mount with the view being taken generally on the plane of line 4—4 of FIG. 3 and looking in the direction of the arrows.

The main body 16 of the mount 14, as also illustrated in FIGS. 2 and 3, is of a generally dished or bulbous configuration having a concave inner surface 18 and a convex outer surface 20. The forward or open end of the main body 16 terminates in an integrally formed ring portion 22 which, as best illustrated in FIG. 3, has an outer annular surface 24 with tab-like flange portions 26, 28 and 30 formed integrally therewith and extending radially outwardly therefrom. The forward end of ring portion 22, in turn, has a generally annular radially inwardly directed lip or flange portion 32 which defines an aperture 34.

A generally radially extending internally defined annular abutment surface 36 cooperates with an inner generally cylindrical wall surface 38 and the inner surface 40 of flange portion 32 to define a generally annular recess 42.

As best seen in FIGS. 1 and 2, the bulb or sealed beam unit 12, as is customary, is provided with bead 44 formed, generally peripherally thereabout, which is received within annular groove or recess 42 so as to be retained therein. Bead 44 may be provided with a rearwardly disposed radiating surface 46 which functions to abut as against cooperating abutment surface 36. When the unit 12 is thusly received and retained within the mount 14 the lens 48 is forwardly directed while the reflector portion 50 is received within the body 16. Reflector portion 50 also carries a male type terminal assembly 52, which may pass through an aperture 54 formed in body 16, as to enable the connection thereto of a cooperating rocket-like terminal assembly 56 forming a part of the electrical circuitry 58 for illumination of the unit 12.

In FIG. 3, the position of vertical line 60 indicates or corresponds to the vertical axis of the vehicle to which the mount 14 would be secured. As is common practice, lamps, such as sealed beam units 12, are provided with a plurality (usually three) of angularly spaced lugs or the like, one of which is typically illustrated at 62 of FIG. 2, for purposes of positioning the unit 12 in a generally predetermined orientation as to thereby assure a particular disposition of the lens 48. This is done since the lens is designed to direct the rays of light mostly in one direction and if the unit 12 were not properly disposed such rays of light could be directed in any number of directions without assurance that such light rays would be directed toward the road surface.

Accordingly, the mount 14 is provided with a plurality of generally radially directed angularly spaced slots or recesses 64, 66 and 68 formed generally in the interior surface 36.

As typically illustrated by slot 64 in FIG. 4, each of the slots has a surface 70 generally rearwardly disposed from the plane of surface 36.

As best illustrated in FIG. 3, in one successful embodiment of the preferred form of the invention, side walls 72 and 74 of slot 68 and side walls 76 and 78 of slot 66 are each spaced from their respective radiating centerlines 80 and 82 a distance of D/2. The angular spacing, W, of centerline 82 from the vertical was in the order of 70° while the angular spacing, Z, of centerline 80 from the vertical was in the order of 20°.

Further, it can be seen that in the preferred embodiment, slot 64 is substantially greater in effective width than slots 66 or 68. That is, a first side wall 84 of slot 64 is shown as being located as to be spaced a distance D/2 away from a radiating centerline-like reference line 86 which, in turn, is angularly spaced from centerline 80; the angular spacing, Y, thereof being in the order of 120°. A second side wall 88 of slot 64 is shown as being located as to be spaced a distance D/2 away from a radiating centerline-like reference line 90 which, in turn, is angularly spaced from radial reference line 86 by an angular spacing, X, which is in the order of 10°.

Side walls 76 and 78 of slot 66 and side walls 72 and 74 of slot 68 are effective for receiving therebetween and closely confining opposite sides of bulb lugs typically shown at 62. This assures the prepositioning of the unit 12 in a particular position or location as previously discussed.

Similarly, slot 64 will also accommodate one of the three (usually) lugs 62 carried by the unit 12. However, the relatively greater width of slot 64 enhances the usefulness of the mount 14.

For example, some vehicles are designed to employ a system of four headlamps with a first set of two of such headlamps being situated generally on one side of the vehicle and the other set of two headlamps being situated at the opposite side of the vehicle. In such arrangements each set of two headlamps is usually comprised of one headlamp commonly referred to as a "lower beam" lamp (that is, a lamp unit of relatively lower intensity) and a second headlamp commonly referred to as an "upper beam" (that is, a lamp unit of relatively greater light intensity or one which directs its light rays towards the road at a distance greater than the "lower beam" lamp).

Another physical difference between such "upper" and "lower beam" sealed beam units is that, in comparison, one of the three lugs (typically shown at 62) of the "upper beam" unit is usually angularly spaced 10° from the location of the comparable lug of the "lower beam" unit. Therefore, because of the relatively wider slot 64 the mount 14 may be employed as the mount for either the "upper beam" or "lower beam" sealed beam units. That is, when one type of sealed beam unit is placed within a mount 14 two lugs will be respectively received in slots 66 and 68 so as to be contained by side walls 76, 78 and 72, 74 thereof, while the third lug will be received in slot 64 and brought into juxtaposed relationship with only one of the side walls as, for example, wall 84. When the other type of sealed beam unit is placed within a mount 14, two lugs thereof will be respectively received in slots 66 and 68, as with the first type of sealed beam unit, but the third lug will be received in slot 64 in a position juxtaposed with only side wall 88.

Accordingly, in view of the above, it can be seen that a mount 14 provided with an appropriately enlarged slot 64 can perform the function of receiving therein both types of sealed beam units 12, thereby requiring only one type of headlamp mount in a vehicle employing a four-headlamp system.

In at least one successful embodiment of the invention the mount 14 was formed by being molded of polyethylene. However, the practice of the invention is, of course, not limited to the use of merely polyethylene. That is, any material having a suitable degree of resiliency may be employed. The only requirement being that the overall mount 14 not be totally hard or stiff so that: (a) the mount 14 acts as a vibrational shock absorber between the headlamp unit 12 and the vehicle to which the mount 14 is secured; and (b) the flange or lip 32 have sufficient resiliency to permit and undergo resilient distortion in order to enable the insertion and, when necessary, extraction or removal of the sealed beam unit 12 from the mount 14. Accordingly, it should be appreciated that even rubber of sufficient resiliency may be employed as the material for forming the mount 14.

In the preferred form of the invention, a plurality of gussetts or ribs, some of which are typically illustrated at 92, are formed as between the rearward surface of ring 22 and outer surface 20 of body portion 16. Such gussetts may be angularly spaced from each other, in the order of 45°, about the entire mount 14. Further, tabs or lugs 26, 28 and 30 are respectively provided with apertures 94, 96 and 98 formed therethrough for the reception of respective mounting and adjusting screws, two of which are shown at 100 and 102 of FIG. 1.

The mount 14 is adapted for direct mounting to for example, a related vehicular structure such as an automotive vehicle fragmentarily illustrated at 10 of FIG. 1. For purposes of discussion and illustration, let it be assumed the members 104 and 106 comprise portions of the sheet metal of the front end of a vehicle (often defining the forward end of the vehicular front fender). Members 104 and 106 may be formed integrally or secured to each other by any suitable means. In any event, member 106, which has a general clearance aperture 108 accommodating the free passage therethrough of body portion 16 of mount 16 as well as the radiating ribs 92, is provided with a plurality of recessed like portions, two of which are shown at 110 and 112. Each of the recesses has a clearance aperture formed at the end thereof, as typically shown at 114, which permits the free passage of the threaded shank 116 of the related mounting screw. A nut 118 is secured, as by welding, to the outer end face of each of the cup-like recesses so as to be threadably engageable with the cooperating adjustment screw. Additionally, a coiled compression spring 120 is situated about each of the adjustment screws in a manner placing such spring between the generally closed end of the cup-like portions and the ears or flange portions 26, 28 and 30. Preferably, washer-like members 122 are placed between the rearward surfaces of flange portions 26, 28 and 30 and juxtaposed ends of springs 120 in order to thereby eliminate undue wear by the spring ends of the material forming the flange portions.

The third adjustment screw, not shown but equivalent to screws 100 and 102, would similarly pass through aperture 94 of flange portion 26 and would cooperate with a third cup-like recess, spring, nut and washer like that depicted at, for example, 110, 120, 118 and 120.

Accordingly, in view of the above, it can be seen that with the sealed beam unit 12 contained within the mount 14, the sealed beam unit 12 can be accurately aimed for desired light ray emission simply by threadably adjusting screws 100, 102 and the not-shown third adjustment screw. Since these adjustment screws define a three-point mounting suspension with reference to the vehicle, it is possible to aim the sealed beam unit in any desired direction.

Member 124 is intended to depict, for example, the usual grille of an automotive vehicle. If desired, a suitable extension or decorative bezel 126 may be provided which would generally overlap the radial flange 32 of mount 14. These, of course, are matters of choice and are not required for the practice of the invention.

Among the many advantages of the invention are: (1) The invention provides a unitary structure which can be directly secured to a related vehicle and which isolates the sealed beam unit or lamp from any vibrational shocks experienced by such vehicle; (2) No special tools, in fact in most cases no tools at all, are required for either placing the sealed beam unit 12 within the mount 14 or in removing a "burned-out" sealed beam unit from the mount 14. All that is necessary to either place or remove a unit 12 is to manually deflect or resiliently deform a portion of the resilient flange or lip 32 to permit the passage therethrough of the lamp head 44. Such deformation can be done with the use of the operator's fingers and without the necessity of any tools or at least any special tools; (3) The mount 14 may be made of any suitable plastic having any desired inherent or pigment added color in order to thereby conform to the required coloring associated with the vehicle to which the mount is secured. This would also obviate the necessity of any bezel, such as 126, in order to provide a bright chrome feature since the plastic forming the mount 14 could be made to contain metal particles or even vacuum or flash chromed; and (4) The use of the mount 14 enables a reduction in the cost of the associated vehicle in at least two different aspects. Heretofore, it has been accepted practice, in vehicle manufacturing, to provide a generally transversely extending metal plate, located somewhat rearwardly of the headlamps or sealed beam unit, which had a concave surface formed therein and often carried a portion of the related electrical circuitry including a socket for connection to the sealed beam unit. The sealed beam unit was, however, actually secured to additional structure not necessarily directly related to the said metal plate. The primary function of that transverse metal plate was to prevent water, mud and snow from being thrown or splashed onto the sealed beam unit. Consequently, the metal plate was subjected to corrosion and after a period of years often failed to perform its function (as well as permitting short circuitry of the electrical circuitry) because of the extent of corrosion experienced. However, with the mount 14 of the invention, such a transverse metal plate is not necessary because body portion 16 itself, serves as a shield against such as water, mud and snow and since it is non-metallic, it will not undergo corrosion. This, in turn, means that such transverse metal plates can be eliminated from the vehicle with the savings of such attendant costs attributable to the cost of the material, cost of the dies for forming the metal plate as well as the concave portion, cost of physically attaching the wiring thereto and cost of labor and tooling in assembling the metal plate to the vehicle.

Although only one preferred embodiment of the invention has been disclosed and described, it is apparent that other embodiments and modifications of the invention are possible within the scope of the appended claims.

We claim:

1. A resilient shock absorbing device for mounting a lamp to a related vehicle, comprising a unitary non-metallic mount, said non-metallic mount comprising a rearwardly disposed body portion generally defining an interior chamber adapted for at least the partial reception therein of said lamp, said chamber defining a generally forwardly directed open end, a ring portion formed integrally with and on said body portion in a manner generally circumscribing said open end, said ring portion comprising an inner groove formed therein, said inner groove comprising first wall means having an effective plane generally transversely to the medial axis of said interior chamber and effective to abuttingly engage a rearward surface of said lamp and integrally formed generally transversely directed resiliently deflectable non-metallic flange means axially spaced from said first wall means generally along said medial axis and defining a forward aperture generally therebetween, said deflectable flange means being capable of substantial resilient deflection to increase the size of said forward aperture and being effective upon said deflection to permit the passage of said lamp through said forward apertue of increased size and being further effective when not experiencing said deflection to retain said lamp in a seated position determined by said groove said first wall means and said deflectable flange means, and a plurality of non-metallic flange-like mounting portions formed on said non-metallic mount adapted for operative connection to said related vehicle.

2. A resilient shock absorbing device according to claim 1, wherein said ring portion is of a generally annular configuration, and wherein said inner groove is also of a generally annular configuration.

3. A resilient shock absorbing device according to claim 1, wherein said unitary non-metallic mount is formed of polyethylene.

4. A resilient shock absorbing device according to claim 1 and further comprising a rearward aperture formed through said rearwardly disposed body portion, said rearward aperture being located as to be generally centrally disposed with respect to said body portion.

5. A resilient shock absorbing device according to claim 1, wherein said inner groove is defined generally by said first wall means and a second generally transversely extending wall opposed to said first wall means and disposed generally forwardly with respect to said first wall means, said first wall means comprising a first rearwardly disposed generally transversely extending wall, and a generally peripheral wall portion interconnecting said first and second walls.

6. A resilient shock absorbing device according to claim 5, and further comprising a plurality of recesses formed in the surface of said first rearwardly disposed wall, said plurality of recesses being spaced from each other as to accommodate the reception therein of related locating lugs carried by said lamp.

7. A resilient shock absorbing device according to claim 2, wherein said inner groove is defined generally by a second forwardly disposed generally radially extending annular wall and said first wall means, said first wall means comprising a first rearwardly disposed generally radially extending annular wall opposed to said second wall, and a generally cylindrical wall portion interconnecting said first and second walls, and further comprising a plurality of recesses formed in the surface of said second rearwardly disposed wall, said plurality of recesses being respectively angularly spaced from each other as to accommodate the reception therein of related locating lugs carried by said lamp.

8. A resilient shock absorbing device for mounting a lamp to a related vehicle, comprising a unitary non-metallic mount, said non-metallic mount comprising a rearwardly disposed body portion generally defining an interior chamber adapted for at least the partial reception therein of said lamp, said chamber defining a generally forwardly directed open end, a generally annular ring portion formed on said body portion in a manner generally circumscribing said open end, said ring portion comprising a generally annular inner groove formed therein, said ring portion further comprising generally transversely directed resiliently deflectable flange means, said deflectable flange means being effective upon deflection to permit the passage therethrough of said lamp and being further effective when not experiencing said deflection to retain said lamp in a seated poistion determined by said groove, a plurality of flange-like mounting portions formed on said non-metallic mount adapted for operative connection to said related vehicle, said inner groove being defined generally by a first forwardly disposed generally radially extending annular wall, a second rearwardly disposed generally radially extending annular wall opposed to said first wall and a generally cylindrical wall portion interconnecting said first and second walls, and a plurality of recesses formed in the surface of said second rearwardly disposed wall, said plurality of recesses being respectively angularly spaced from each other as to accommodate the reception therein of related locating lugs carried by said lamp, two of said recesses being of substantially the same effective width, and a third of said recesses being of an effective width approximately twice the said effective width of each of said two recesses.

9. A resilient shock absorbing device for mounting a lamp to a related vehicle, comprising a unitary non-metallic mount, said non-metallic mount comprising a rearwardly disposed body portion generally defining an interior chamber adapted for at least the partial reception therein of said lamp, said chamber defining a generally forwardly directed open end, a generally annular ring portion formed on said body portion in a manner generally circumscribing said open end, said ring portion comprising a geneally annular inner groove formed therein, said ring portion further comprising generally transversely directed resiliently deflectable flange means, said deflectable flange means being effective upon deflection to permit the passage therethrough of said lamp and being further effective when not experiencing said deflection to retain said lamp in a seated position determined by said groove, a plurality of flange-like mounting portions formed on said non-metallic mount adapted for operative connection to said related vehicle, said inner groove being defined generally be a first forwardly disposed generally radially extending annular wall, a second rearwardly disposed generally radially extending annular wall opposed to said first wall and a generally cylindrical wall portion interconnecting said first and second walls, and a plurality of recesses formed in the surface of said second rearwardly disposed wall, said plurality of recesses being respectively angularly spaced from each other as to accommodate the reception therein of related locating lugs carried by said lamp, one of said plurality of recesses having its medially disposed centerline angularly spaced substantially 20° from the vertical, wherein a second of said plurality of recesses having its medially disposed centerline angularly spaced substantially 125° from said centerline of said one of said plurality of recesses, and a third of said plurality of recesses having its medially disposed centerline angularly spaced substantially 130° from said centerline of said one of said plurality of recesses but in an angular direction opposite to said second of said plurality of recesses.

10. A resilient shock absorbing device according to claim 9, wherein said third recess is of an effective width approximately twice the effective width of the other of said plurality of recesses.

11. A resilient shock absorbing device for mounting a lamp to a related vehicle, comprising a unitary non-metallic mount, said non-metallic mount comprising a rearwardly disposed body portion generally defining an interior chamber adapted for at least the partial reception therein of said lamp, said chamber defining a generally forwardly directed open end, a ring portion formed on said body portion in a manner generally circumscribing said open end, said ring portion comprising an inner groove formed therein, said ring portion further comprising generally transversely directed resiliently deflectable flange means, said deflectable flange means being effective upon deflection to permit the passage therethrough of said lamp and being further effective when not experiencing said deflection to retain said lamp in a seated position determined by said groove, a plurality of flange-like mounting portions formed on said non-metallic mount adapted for operative connection to said related vehicle, and a plurality of reinforcing ribs formed integrally with and generally between said rearwardly disposed body portion and a rearwardly disposed end surface of said ring portion.

12. A vehicle lamp mounting arrangement, comprising, in combination, a resilient shock absorbing device for mounting a sealed beam unit to said vehicle, said shock absorbing device comprising a unitary non-metallic mount, said non-metallic mount comprising a rearwardly disposed body portion generally defining an interior chamber adapted for at least the partial reception therein of said sealed beam unit, said chamber defining a generally forwardly directed open end, an annular ring portion formed on said body portion in a manner generally circumscribing said open end, said annular ring portion comprising an inner groove formed therein, said groove being comprised of a first forwardly disposed generally radially extending annular wall, a second rearwardly disposed generally radially extending annular wall and a generally cylindrical wall portion joining said first and second walls, said first wall also defining resiliently deflectable flange means, said deflectable flange means being effective upon deflection to permit the passage therethrough of said sealed beam unit and being further effective when not experiencing said deflection to retain said sealed beam unit in a seated position in said groove, a plurality of flange-like mounting portions formed on said non-metallic mount, a plurality of anchoring means carried by said vehicle, a plurality of first clearance apertures respectively formed through said flange-like mounting portions, a plurality of screws respectively passing through said clearance apertures and threadably engaging said anchor means, a plurality of compression springs respectively situated about said screws and longitudinally confined between said anchoring means and said flange-like mounting portions, and a second clearance aperture formed through said rearwardly disposed body portion, said second clearance aperture permitting the passage therethrough of related vehicular electrical circuitry for connection to said sealed beam unit.

13. A resilient shock absorbing device according to claim 11, wherein said ring portion is of a generally annular configuration, and wherein said inner groove is also of a generally annular configuration.

14. A resilient shock absorbing device according to claim 11 and further comprising an aperture formed through said rearwardly disposed body portion, said aperture being located as to be generally centrally disposed with respect to said body portion.

15. A resilient shock absorbing device according to claim 11, wherein said inner groove is defined generally by a first downwardly disposed generally transversely extending wall, a second rearwardly disposed generally transversely extending wall opposed to said first wall, and a generally peripheral wall portion interconnecting said first and second walls.

16. A resilient shock absorbing device according to claim 15, and further comprising a plurality of recesses formed in the surface of said second rearwardly disposed wall, said plurality of recesses being spaced from each other as to accommodate the reception therein of related loacting lugs carried by said lamp.

17. A resilient shock absorbing device according to claim 16, wherein two of said recesses are of substantially the same effective width, and wherein a third of said recesses is of an effective width approximately twice the effective width of one of said two recesses.

18. A resilient shock absorbing device according to claim 16, wherein one of said plurality of recesses has its medially disposed centerline angularly spaced substantially 20° from the vertical, wherein a second of said pluality of recesses has its medially disposed centerline angularly spaced substantially 125° from said centerline of said one of said plurality of recesses, and wherein a third of said plurality of recesses has its medially disposed centerline angularly spaced substantially 130° from said centerline of said one of said plurality of recesses but in an angular direction opposite to said second of said plurality of recesses.

19. A resilient shock absorbing device according to claim 18, wherein said third recess is of an effective width approximately twice the effective width of the other of said plurality of recesses.

* * * * *